United States Patent [19]

Smith et al.

[11] Patent Number: 5,443,056
[45] Date of Patent: Aug. 22, 1995

[54] EXOTHERMIC HEATER DEVICE

[75] Inventors: W. Stan Smith, Florence, Ky.; Robert D. Deutsch, Wyoming, Ohio; Fred H. Hockney, Fort Thomas, Ky.; Angela Garland, Fairfield, Ohio

[73] Assignee: Zestotherm Inc., Cincinnati, Ohio

[21] Appl. No.: 243,387

[22] Filed: May 16, 1994

[51] Int. Cl.⁶ .............................................. F24J 1/00
[52] U.S. Cl. ................... 126/263.05; 126/263.01
[58] Field of Search ............ 126/263 R, 263 C, 263 D, 126/263 E, 206, 261, 246; 44/251, 250

[56] References Cited

U.S. PATENT DOCUMENTS

| | | | |
|---|---|---|---|
| 1,620,581 | 3/1927 | Smith | 126/263 D |
| 2,930,634 | 3/1960 | Merritt | 126/263 R |
| 2,961,363 | 11/1960 | Lowes | 126/263 R |
| 3,175,558 | 3/1965 | Caillouette et al. | 126/263 E |
| 3,475,239 | 2/1969 | Fearon et al. | |
| 3,542,402 | 11/1970 | Caples | 126/263 R |
| 3,663,335 | 5/1972 | Sheedy | 126/263 R |
| 4,080,953 | 3/1978 | Mitchell et al. | |

*Primary Examiner*—James C. Yeung
*Attorney, Agent, or Firm*—Jacox & Meckstroth

[57] ABSTRACT

A mixture of magnesium-iron alloy and salt is confined within a nonwoven cellulose covering and forms an elongated cartridge which is wrapped with multiple layers of absorbent paper. The cartridge and paper are enclosed within a pouch of perforated plastic film to form a heating element. One or more heating elements are attached by adhesive tape to the inside of a generally triangular polyethylene film envelope, and peripheral portions of the envelope are heat sealed to form an enclosed chamber. An overlying mating sheet of polyethylene coated nylon film and a pad of thermoplastic foam material are heat sealed to peripheral portions of the envelope, and parallel strips of double-sided adhesive tape, with removal protective strips, are attached to the outer surface of the envelope to form a flexible heater device. The device is used by being wrapped around either a vertical or horizontal pipe joint containing a heat activated epoxy. An upper sealed corner portion of the envelope is cut and removed to form an opening for the chamber, and water is poured through the opening into the chamber to initiate an exothermic reaction with each heating element for heating the pipe joint and epoxy to accelerate curing of the epoxy.

21 Claims, 1 Drawing Sheet

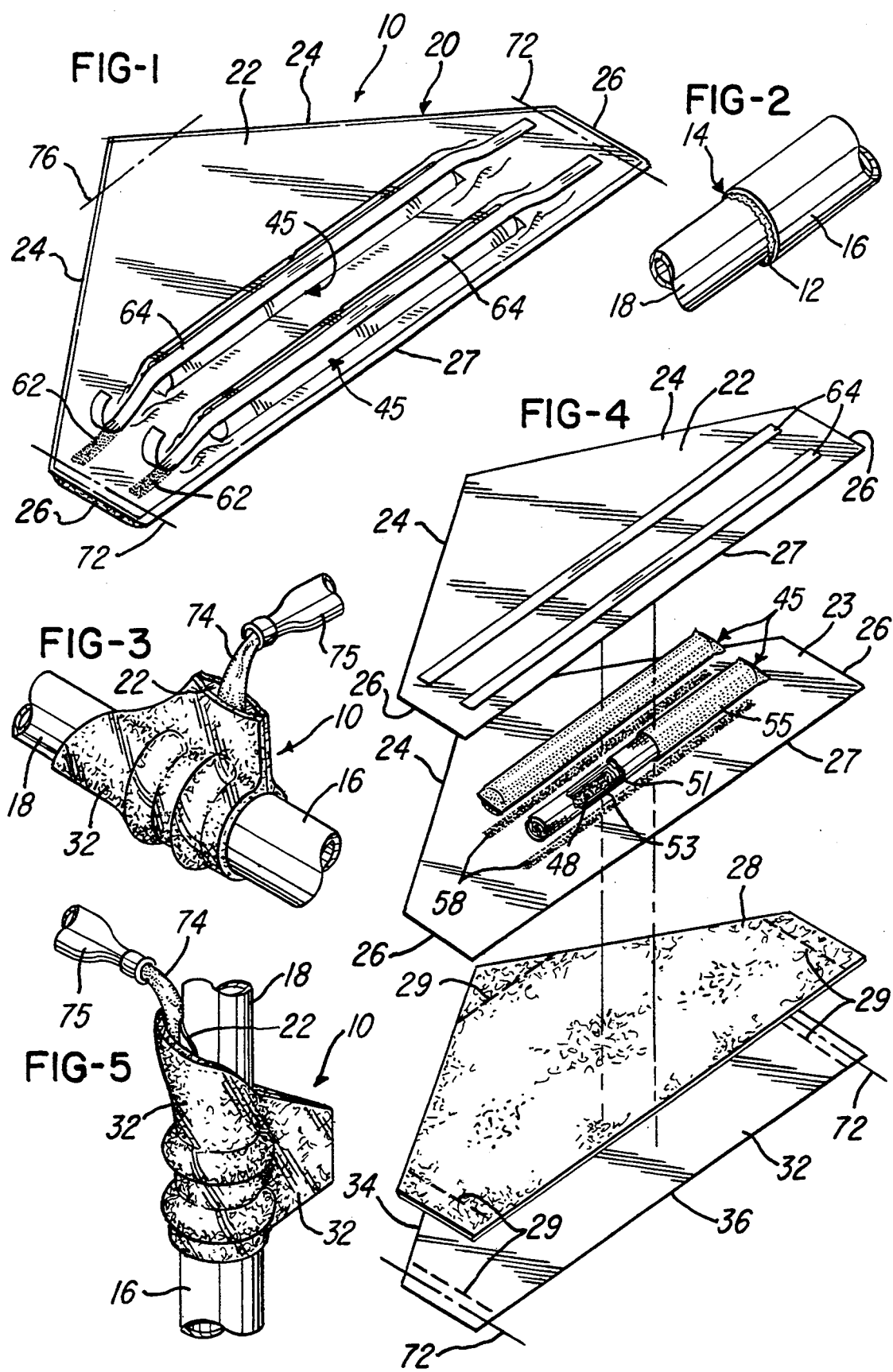

5,443,056

EXOTHERMIC HEATER DEVICE

BACKGROUND OF THE INVENTION

This invention relates to an exothermic heater device of the general type disclosed in U.S. Pat. Nos. 3,475,239 and 4,080,953, the disclosures of which are incorporated herein by reference. The heater device disclosed in U.S. Pat. No. 3,475,239 incorporates a flexible envelope which is divided into two separate sections and is attached by adhesive to an insulating backing pad. The envelope sections contain acid and base chemicals which are manually mixed together immediately prior to using the heater device. After the chemicals are mixed together and spread uniformally within the envelope sections, the envelope and pad are wrapped around a fiberglass pipe joint as shown in FIGS. 3 & 4 of the patent. Water is then injected into each envelope section and causes the chemicals to produce an exothermic reaction which generates heat for accelerating the curing of epoxy adhesive surrounding the pipe joint. The heater device may also be used for heating other articles and is not limited to heating only epoxy adhesive for accelerating the curing process.

It has been determined that the manual mixing of the chemicals and the spreading or distribution of the mixture to obtain uniform heating is time consuming, and if these steps are not performed properly, a safety problem can occur due to the mixed lime and acid powder which comprises the mixture. It has also been found that a precise amount of water is required in order for the heater to work properly and not generate an excessive amount of heat which may damage the fiberglass pipe. The heater devices disclosed in the '239 patent are also intended for use with a horizontal pipe coupling or a Tee connection into a horizontal pipe, as shown in FIG. 4 of the patent.

SUMMARY OF THE INVENTION

The present invention is directed to an improved exothermic heater device which is adapted for use in different positions, and which is ideally suited for heating an epoxy adhesive on a pipe joint in either a horizontal pipe or a vertical pipe. The heater device of the invention provides for substantially uniform heating of the article to be heated such as a pipe joint and the epoxy adhesive and is easy to use since the device uses exothermic materials which require no mixing and spreading prior to use. The heater device of the invention is also safe as it emits no toxic by-products while in use and can be operated without any danger of overheating.

In accordance with a preferred embodiment of the invention, a generally triangular envelope is formed by heat sealing the peripheral edge portions of a folded sheet or panel of plastics film material. The envelope defines a sealed chamber which encloses one or more elongated heating elements each of which includes a mixture of magnesium-iron alloy and salt confined within a non-woven cellulose covering forming a cartridge. Each cartridge is wrapped with multiple layers of absorbent paper and enclosed within a pouch of perforated film. Each pouch is adhesively attached to the inside of the envelope, and strips of double-sided adhesive tape, with removable protective strips, are attached to the outer surface of the envelope. A correspondingly shaped foam pad and film panel have corner portions heat welded together, and the film panel has peripheral portions heat welded to the envelope.

When it is desired to use the heater device, the protective strips are removed, and the envelope is wrapped around either a horizontal or vertical pipe joint for surrounding the heat activated epoxy. An upper sealed corner portion of the envelope is cut to define a top opening for the chamber, and water is poured through the opening into the chamber to initiate the exothermic reaction which heats the pipe joint and epoxy for accelerating the curing of the epoxy.

Other features and advantages of the invention will be apparent from the following description, the accompanying drawing and the appended claims.

BRIEF DESCRIPTION OF THE DRAWINGS

FIG. 1 is a perspective view of an exothermic heater device constructed in accordance with the invention;

FIG. 2 is a fragmentary perspective view of a typical pipe joint which utilizes an epoxy adhesive;

FIG. 3 is a perspective view of the heater unit of FIG. 1 and shown wrapped around and attached to a horizontal pipe joint;

FIG. 4 is an exploded perspective view of the components forming the heater unit shown in FIG. 1; and FIG. 5 is a perspective view of the heater device shown in FIG. 1 and illustrating its use on a vertical pipe joint.

DESCRIPTION OF THE PREFERRED EMBODIMENT

FIG. 1 illustrates a heater device 10 which is ideally suited for accelerating the curing of epoxy adhesive 12 (FIG. 2) used in a pipe joint formed by interfitting portions of a rigid fiberglass pipe 16 and a smaller interfitting fiberglass pipe 18. However, the heater device 10 may also be used for heating other articles whenever a substantial temperature is required for a period of time. For example, the heater device 10 may be constructed to produce a temperature of about 150 degrees for approximately 60 minutes when it is used for accelerating the curing of the heat activated epoxy 12. The heater device 10 may also be constructed in different sizes, for example, to be used with different sizes of fiberglass pipe ranging from two inches to six inches.

Referring to FIGS. 1 and 4, the heater device 10 includes a generally triangular flexible plastic film envelope 20 formed by mating film sheets or panels 22 and 23 having peripheral edge portions 24, 26 and 27 heat welded together to define an enclosed sealed chamber. A generally triangular flexible pad 28 of thermoplastic foam material is positioned adjacent the envelope 20 and has a thickness of about ¼ inch. The pad 28 provides for thermal insulation and has three corner portions which are heat-welded along lines 29 (FIG. 4) to the corresponding corner portions of an adjacent flexible panel 32 of a plastics film material. The film panel 32 has peripheral edge portions 34 and 36 which are also heat-welded to the corresponding edge portions 24 and 27 of the envelope 20. The welded together edge portions 24, 26 and 27 of the envelope 20 provide the envelope 20 with a length substantially greater than its height.

A pair of parallel spaced elongated heater elements 45 are confined within the envelope chamber between the panels 22 and 23, and each heating element 45 includes a mixture 48 of magnesium-iron alloy and salt. The mixture is confined or enclosed within an elongated cartridge 51 of a non-woven cellulose material. Preferably, the composition of the mixture 48 is the same as disclosed in U.S. Pat. No. 4,264,362, the disclosure of which is incorporated by reference. The cartridge 51 of each heater element 45 is wrapped in an absorbent paper medium 53, such as a paper towel material, which wraps around the cartridge 51 to form multiple layers. The wrapped paper medium 53 is enclosed within an elongated pouch 55 formed by a pair of adjacent strips of perforated polyethylene film, and peripheral edge portions of the strips are heat-welded together.

Each of the heater elements 45 is attached to the inner surface of the envelope panel 23 by a double-sided adhesive tape 58 so that the heating elements are arranged in parallel spaced relation to the heat-welded longitudinal edge portion 27 of the panel 23. While two heater elements 45 are illustrated in FIGS. 1 and 4, it is to be understood that only one heating element 45 may be used or more than two heating elements may be used, depending upon the time and temperature of the heat required from the heater device 10.

The outer surface of the panel 22 forming the envelope 20 is provided with a pair of parallel spaced strips 62 of double-sided adhesive tape which are normally covered by removable protective strips 64 of releasable paper. As shown in FIG. 1, the adhesive tape strips 62 on the outer surface of the envelope 20 generally overlie the pair of heater elements 45 within the envelope 20.

FIGS. 3 and 5 illustrate typical uses of the heater device 10 and showing how the heater device is attached on a pipe joint when the fiberglass pipes 16 and 18 extend horizontally (FIG. 3) or vertically (FIG. 5). Referring to FIGS. 2 and 3, after the epoxy adhesive 12 is applied so that it extends within the pipe joint 14 and its desire to cure the adhesive, the protective strips 64 are removed from the adhesive strips 62, and the device 10 is wrapped around the horizontal pipe joint. The adhesive strips 62 attach the envelope 20 to the pipes 16 and 18 and also attach the upper corner portions of the envelope 20 to each other, as shown in FIG. 3. The upper corner portions of the envelope panels 22 and 24 are then cut along indicator lines 72 (FIG. 1) which are printed on the outer sheet 32.

When the envelope 20 is cut along at least one of the lines 72 with a knife or a pair of scissors and parallel to the heat-weld 29, a top opening is formed for the chamber within the envelope 20. Water 74 is then poured through the opening into the chamber from a container 75. The water penetrates slowly through the pouch 55, paper medium 53 and cartridge 51 of each heater element 45 and slowly passes into the mixture 48 for causing an exothermic chemical reaction to produce a timed release of heat from each heating element 45. If desired, a wire (not shown) may be wrapped around the upwardly projecting corner portions of the device 10 (FIG. 3) to assure that the device remains wrapped around the horizontal pipe joint 14 and that the adhesive strips 62 do not separate from the pipes and/or from each other.

When it is desired to use the heater device 10 for accelerating the curing of epoxy adhesive around a vertical pipe joint, the device 10 is attached to the pipe joint as shown in FIG. 5. The panels 22 and 23 forming the envelope 20 are then cut along an indicator line 76 (FIG. 1) which is also printed on the nylon sheet or panel 28. When the envelope 20 is cut along the line 76, the opening to the chamber is formed within the top of the envelope (FIG. 5) so that water 74 may be poured from the container 75 into the chamber which encloses the heater elements 45. Thus the heater device 10 may be selectively used in connection with curing the epoxy adhesive for either a vertical pipe joint or a horizontal pipe joint.

From the drawing and the above description, it is apparent that a heater device 10 constructed in accordance with the present invention, provides desirable features and advantages. For example, the construction of each of the heater elements 45 and its enclosure within the water-tight chamber defined by the envelope 20, enables the heater device 10 to be conveniently used simply by wrapping the device around the pipe joint, cutting an opening within the top portion of the envelope and adding water.

The materials used within the heater elements 45 emit no toxic by-products during or after activation. The enclosure of the mixture 48 within the cartridge 51 and surrounding absorbent paper medium 53 provides for slow penetration of the water into the mixture. As a result, heat is generated over a substantial period of time. As the heater elements heat the water, and the water heats the pipe, the risk of overheating the pipe joint and epoxy is minimized or substantially eliminated. In addition, the generally triangular configuration of the heater device 10 and the arrangement of each heater element 45, permit the heater device to be used in various orientations such as around horizontal or vertical pipe joints or around the female portions of fittings such as elbows and Tee fittings. The use of the mixture 48 also eliminates the requirement for manual mixing and spreading of chemicals prior to wrapping the heater device. Also, the flexible closed cell polyethylene foam pad 28 between the envelope 20 and film panel 32 provides for insulating the water as it is being heated within the envelope 20.

While the form of heater apparatus herein described constitutes a preferred embodiment of the invention, it is to be understood that the invention is not limited to this precise form of apparatus, and that changes may be made therein without departing from the scope and spirit of the invent ion as defined in the appended claims.

We claim:

1. An exothermic heater device adapted for accelerating the cure of epoxy adhesive around a pipe joint, said device comprising liquid impervious flexible panels having corresponding portions connected together to form an envelope defining an internal chamber, at least one heater unit disposed within said chamber and including a mixture of liquid actuated exothermic materials, said envelope having a configuration providing for wrapping said envelope around a joint within either a horizontal pipe or a vertical pipe, means for securing said envelope to either a horizontal pipe or a vertical pipe and including at least one elongated strip of pressure sensitive adhesive attached to said envelope, said strip being positioned to be wrapped around said pipe with said envelope, a removable protective strip overlying said adhesive strip, and said envelope having means for defining an opening within an upper portion of said envelope for adding liquid to said chamber when said envelope is attached to either a horizontal pipe or a vertical pipe.

2. A heater device as defined in claim 1 wherein said envelope has generally a triangular configuration with corner port ions for defining selectable openings for adding liquid into said chamber.

3. A heater device as defined in claim 1 and including a flexible panel of closed cell thermoplastics foam insulation material overlying said envelope and attached to said envelope.

4. A heater device as defined in claim 1 wherein said flexible panels forming said envelope comprises plastics film material having corresponding heat-welded edge portions.

5. A heater device as defined in claim 1 wherein said envelope has a length substantially greater than its height, a plurality of said strips of pressure sensitive adhesive extend lengthwise of said envelope and in generally parallel spaced relation, and a corresponding plurality of said removable protective strips on said adhesive strips.

6. A heater device as defined in claim 1 wherein said envelope is connected around its entire periphery to define a fluid-tight sealed said chamber, and means for indicating where to cut an edge portion of said envelope in selectable different locations to define said opening for supplying liquid to an upper portion of said chamber.

7. A heater device as defined in claim 1 and including means connected to said envelope and printed with instructions for using said device.

8. A heater device as defined in claim 1 wherein said heater unit comprises multiple layers of absorbent paper material surrounding said mixture of exothermic materials, and a pouch of liquid passing material surrounding said layers of paper material.

9. A heater device as defined in claim 8 wherein said heater unit is elongated and flexible.

10. A heater device as defined in claim 1 wherein said envelope is generally triangular in configuration and is sealed completely around its peripheral edge portion to define a fluid-tight said chamber, and said envelope has three corner edge portions adapted to be selectively cut to define said opening within said envelope for adding liquid into said chamber.

11. A heater device as defined in claim 1 wherein said exothermic materials comprise magnesium-iron alloy and salt.

12. An exothermic heater device adapted for accelerating the cure of epoxy adhesive around a pipe joint, said device comprising liquid impervious flexible panels having generally a triangular configuration and corresponding peripheral portions connected together to form a sealed envelope defining an internal fluid-tight chamber, at least one heater unit disposed within said chamber and including a mixture of liquid actuated exothermic materials, said triangular configuration of said envelope providing for wrapping said envelope around a joint within either a horizontal pipe or a vertical pipe, adhesive strip means for securing said envelope to either a horizontal pipe or a vertical pipe, and said envelope having corner portions adapted to be selectively cut for defining an opening within an upper corner portion of said envelope for adding liquid to said chamber when said envelope is attached to either a horizontal pipe or a vertical pipe.

13. A heater device as defined in claim 12 and including a panel of insulation material for limiting heat transfer from said envelope.

14. A heater device as defined in claim 13 and including a generally triangular panel of plastics film material and having edge portions heat-welded for retaining said panel of insulation material.

15. An exothermic heater device adapted for accelerating the cure of epoxy adhesive around a pipe joint, said device comprising a flexible panel of thermal insulation material, a flexible sheet of plastics film material adjacent said panel and having peripheral portions connected together to form a sealed envelope defining an internal fluid-tight chamber, at least one heater unit disposed within said chamber and including a mixture of liquid actuated exothermic materials including magnesium-iron alloy and salt, said envelope adapted to be wrapped around a joint within a pipe, means for securing said envelope to the pipe, and said envelope having means for defining an opening within an upper portion of said envelope for adding liquid to said chamber after said envelope is attached to the pipe.

16. A heater device as defined in claim 15 wherein said envelope has a length substantially greater than its height, and said securing means comprise a plurality of strips of pressure sensitive adhesive extending lengthwise of said envelope and in generally parallel spaced relation, and a corresponding plurality of removable protective strips on said adhesive strips.

17. A heater device as defined in claim 15 and comprising means with printed instructions and including lines for indicating where to cut said envelope.

18. A heater device as defined in claim 15 wherein said heater unit is elongated and comprises multiple layers of absorbent paper material surrounding said mixture of exothermic materials, and a pouch of liquid passing material surrounding said layers of paper material.

19. A heater device as defined in claim 15 wherein said means for securing said envelope to the pipe comprise at least one elongated strip of pressure sensitive adhesive attached to an outer surface of said envelope.

20. An exothermic heater device adapted for accelerating the cure of epoxy adhesive around a pipe joint, said device comprising liquid impervious flexible panels having corresponding portions connected together to form an envelope defining an internal chamber, a plurality of elongated heater units disposed within said chamber in parallel spaced relation, each of said heater units including a mixture of liquid actuated exothermic materials surrounded by multiple layers of absorbent material enclosed within an elongated pouch of liquid passing material, said envelope having a configuration providing for wrapping said envelope around a joint within a pipe, means for securing said envelope to the pipe and including at least one elongated strip of pressure sensitive adhesive attached to said envelope, a removable protective strip overlying said adhesive strip, and said envelope having means for defining an opening within an upper portion of said envelope for adding liquid to said chamber when said envelope is attached to the pipe.

21. A heater device as defined in claim 20 wherein said means for defining and opening comprise lines indicating where to cut said envelope at selectable different locations according to the position of said heater device.

* * * * *